US012753799B2

(12) United States Patent
Takada et al.

(10) Patent No.: US 12,753,799 B2
(45) Date of Patent: Oct. 6, 2026

(54) CAGE FOR ROLLING BEARING AND ROLLING BEARING

(71) Applicants: JAPAN AEROSPACE EXPLORATION AGENCY, Tokyo (JP); NTN CORPORATION, Osaka (JP)

(72) Inventors: Satoshi Takada, Tokyo (JP); Hiromitsu Kakudo, Tokyo (JP); Kohei Hoshino, Mie (JP); Tomoya Nakamura, Mie (JP)

(73) Assignees: JAPAN AEROSPACE EXPLORATION AGENCY, Tokyo (JP); NTN CORPORATION, Osaka (JP)

( * ) Notice: Subject to any disclaimer, the term of this patent is extended or adjusted under 35 U.S.C. 154(b) by 292 days.

(21) Appl. No.: 18/684,831

(22) PCT Filed: Aug. 24, 2022

(86) PCT No.: PCT/JP2022/031951
§ 371 (c)(1),
(2) Date: Feb. 19, 2024

(87) PCT Pub. No.: WO2023/027130
PCT Pub. Date: Mar. 2, 2023

(65) Prior Publication Data

US 2025/0122905 A1 Apr. 17, 2025

(30) Foreign Application Priority Data

Aug. 27, 2021 (JP) ................................ 2021-139449

(51) Int. Cl.
*F16C 33/38* (2006.01)
*F16C 33/44* (2006.01)

(52) U.S. Cl.
CPC ...... *F16C 33/3887* (2013.01); *F16C 33/3806* (2013.01); *F16C 33/3831* (2013.01); *F16C 33/44* (2013.01); *F16C 2208/32* (2013.01)

(58) Field of Classification Search
CPC .............. F16C 33/3887; F16C 33/3806; F16C 33/3831; F16C 33/44; F16C 2208/32;
(Continued)

(56) References Cited

U.S. PATENT DOCUMENTS

2006/0210208 A1 9/2006 Ota et al.
2016/0108965 A1* 4/2016 Kokumai ............ F16C 33/3856 264/279
2022/0186776 A1* 6/2022 Nakamura .............. F16C 19/16

FOREIGN PATENT DOCUMENTS

EP 3951195 A1 2/2022
JP 02-020854 B 5/1990
(Continued)

OTHER PUBLICATIONS

Machine translation of JP 2013-072439 A dated Apr. 22, 2013.
(Continued)

*Primary Examiner* — John Olszewski
*Assistant Examiner* — Aimee Tran Nguyen
(74) *Attorney, Agent, or Firm* — Hedman & Costigan, P.C.; James V. Costigan; Kathleen A. Costigan

(57) ABSTRACT

Provided are a cage for a rolling bearing capable of satisfying different required characteristics while securing cage strength, and a rolling bearing using the cage. A cage 5 holds a plurality of balls 4 in a rolling bearing 1, is guided by an outer ring 3, and includes: cage bodies 8 and 11 having an annular shape and including a pocket hole for accommodating each of the balls 4; a resin portion 9 formed at least in a portion on which each of the balls 4 slides in an inner surface of the pocket hole of the cage body 8; and a resin
(Continued)

portion 12 having a composition different from that of the resin portion 9 and formed in a guide portion of the cage body 11 sliding on the outer ring 3.

10 Claims, 10 Drawing Sheets

(58) Field of Classification Search
CPC .............. F16C 33/6696; F16C 2204/00; F16C 2206/06; F16C 2208/02; F16C 2208/20; F16C 2208/58; F16C 2208/60; F16C 2220/08; F16C 2240/80; F16C 2300/22; F16C 2300/52; F16C 2326/47; F16C 2360/44; F16C 19/06; F16C 33/3843; F16C 33/4605; F16C 33/4611; F16C 33/4623; F16C 33/467
See application file for complete search history.

(56) References Cited

FOREIGN PATENT DOCUMENTS

| | | | | |
|---|---|---|---|---|
| JP | 07-233818 A | | 9/1995 | |
| JP | 2004-068864 A | | 3/2004 | |
| JP | 2006-220240 A | | 8/2006 | |
| JP | 2013-072439 A | | 4/2013 | |
| JP | 2015-232382 A | | 12/2015 | |
| JP | 6178117 B2 | | 8/2017 | |
| JP | 2017180737 A | * | 10/2017 | .......... F16C 33/3856 |
| JP | 2020-169665 A | | 10/2020 | |
| WO | 2020203361 A1 | | 10/2020 | |

OTHER PUBLICATIONS

Supplementary European Search Report in the corresponding application mailed Nov. 11, 2024.
Machine translation of JP 2006-220240 A dated Aug. 24, 2006.
Machine translation of JP 2020-169665 A dated Oct. 15, 2020.
Machine translation of JP 2004-068864 A dated Mar. 4, 2004.
Machine translation of JP 07-233818 A dated Sep. 5, 1995.
Machine translation of JP 2015-232382 A dated Dec. 24, 2015.
Machine translation of JP 6178117 B2 dated Aug. 9, 2017.
Machine translation of JP 02-020854 B dated May 10, 1990.

* cited by examiner

CAGE FOR ROLLING BEARING AND ROLLING BEARING

TECHNICAL FIELD

The present invention relates to a cage for a rolling bearing and a rolling bearing.

BACKGROUND ART

Bearings used for turbopumps of rocket engines or the like are used in a high-speed rotating environment in a cryogenic liquid fuel. In a cryogenic environment, it is difficult to use a commonly used flowable lubricant such as lubricating oil or grease. Therefore, a polytetrafluoroethylene (PTFE) resin or the like is used as a material of a cage for a rolling bearing. This PTFE resin or the like is transferred to a raceway surface or a rolling element by sliding, thereby securing lubricity of the bearing.

For example, Patent Document 1 proposes a cage obtained by laminating a composite material in which a glass fiber cloth is impregnated with a PTFE resin in a ring shape and cutting a pocket. This cage is treated with hydrofluoric acid in order to dissolve glass fibers in a surface layer. This cage can be used in a cryogenic and high-speed rotating environment because the glass fiber cloth imparts strength and the PTFE resin with which the glass fiber cloth is impregnated imparts self-lubricity.

However, in the cage of Patent Document 1, if wear progresses to a layer deeper than a hydrofluoric acid treatment layer on the surface of the cage, glass fibers are exposed on the surface, which may impair the self-lubricity. On the other hand, if the hydrofluoric acid treatment layer is thickened to prevent the exposure of glass fibers, there is a possibility that an increase in hydrofluoric acid treatment time leads to an increase in manufacturing lead time, and a decrease in glass fibers leads to a decrease in cage strength.

Meanwhile, Patent Document 2 proposes a cage in which a resin containing a solid lubricant is insert-molded on a metal base material such as aluminum to integrate a main body portion and a resin portion. In this cage, the metal material such as aluminum secures cage strength, and a pocket surface on which a rolling element slides and a guide portion that slides on an inner ring or an outer ring are formed by the resin portion to secure lubricity.

PRIOR ART DOCUMENTS

Patent Document

Patent Document 1: JP H02-020854 B
Patent Document 2: JP 6178117 B2

SUMMARY OF THE INVENTION

Problems to be Solved by the Invention

In a case where a flowable lubricant cannot be used such as in a cryogenic environment, the cage requires lubricity, and therefore a resin having high self-lubricity, such as a PTFE resin, is required for a slide portion such as an inner surface of a pocket. On the other hand, a guide portion of the cage sliding on a bearing ring requires wear resistance rather than lubricity, and is required to have a capability incompatible with that of the slide portion of the pocket. However, since these are incompatible capabilities, it is difficult to simultaneously improve the capabilities with a single material or structure. In addition, in a case where a bearing is used at high-speed rotation, the cage also requires strength.

The present invention has been made in view of such circumstances, and an object of the present invention is to provide a cage for a rolling bearing capable of satisfying different required characteristics while securing cage strength, and a rolling bearing using the cage.

Means for Solving the Problems

A cage for a rolling bearing according to the present invention is a cage for a rolling bearing that holds a plurality of rolling elements in a rolling bearing and is guided by an inner ring or an outer ring, the cage including: a cage body having an annular shape and including a pocket hole for accommodating each of the rolling elements; a first resin portion formed at least in a portion on which each of the rolling elements slides in an inner surface of the pocket hole of the cage body; and a second resin portion having a composition different from a composition of the first resin portion and formed in a guide portion of the cage body sliding on the inner ring or the outer ring.

The cage body includes a metal portion.

The cage is an outer ring guided cage guided on an inner circumferential surface of the outer ring, and the metal portion includes a first metal portion having an annular shape and positioned on an inner diameter side, and a second metal portion having an annular shape, positioned on an outer diameter side, and to which the first metal portion is fitted, the first resin portion is formed in the first metal portion, and the second resin portion is formed in the second metal portion.

Each of the first metal portion and the second metal portion includes a portion constituting a three-dimensional network lattice, a void of the portion constituting the three-dimensional network lattice of the first metal portion is filled with a part of the first resin portion, and a void of the portion constituting the three-dimensional network lattice of the second metal portion is filled with a part of the second resin portion.

The first metal portion and the second metal portion are bonded together by the second resin portion.

The cage is an outer ring guided cage guided on an inner circumferential surface of the outer ring, and the first resin portion is formed on an inner diameter side of the metal portion, and the second resin portion is formed on an outer diameter side of the metal portion.

The metal portion includes a portion constituting a three-dimensional network lattice, and a void of the portion constituting the three-dimensional network lattice is filled with a part of the first resin portion.

The inner surface of the pocket hole is formed by the first resin portion and the second resin portion, and a boundary between the first resin portion and the second resin portion in the inner surface of the pocket hole is positioned closer to the outer ring than a pitch circle diameter PCD.

Each of the first resin portion and the second resin portion contains a PTFE resin as a base resin and a fibrous reinforcing material, a content of the PTFE resin in the second resin portion is smaller than a content of the PTFE resin in the first resin portion, and a content of the fibrous reinforcing material in the second resin portion is larger than a content of the fibrous reinforcing material in the first resin portion.

The PTFE resin has a number average molecular weight of less than $10^6$.

A metal constituting the metal portion is an aluminum alloy, a titanium alloy, a stainless alloy, or Inconel.

A rolling bearing according to the present invention is a rolling bearing including an inner ring and an outer ring, a rolling element interposed between the inner ring and the outer ring, and a cage configured to hold the rolling element, wherein the cage is the cage for a rolling bearing of the present invention.

Effect of the Invention

In the cage for a rolling bearing of the present invention, the first resin portion is formed at least in the portion on which the rolling element slides in the inner surface of the pocket hole of the cage body, and the second resin portion having a composition different from that of the first resin portion is formed in the guide portion of the cage body sliding on the inner ring or the outer ring. Therefore, it is possible to form lubricative portions having different capabilities between a slide portion between the pocket and the rolling element and a slide portion with the guide portion of the inner ring or the outer ring, thereby improving lubricity and reducing wear. In this manner, the cage includes the cage body and the two resin portions having different compositions, so that two incompatible capabilities can be provided. As a result, the product life can also be expected to be prolonged.

In addition, since the cage body includes the metal portion, it is possible to obtain strength enough for the cage to be used under high hoop stress at high-speed rotation.

As one mode of the cage, the metal portion includes the first metal portion on the inner diameter side and the second metal portion on the outer diameter side, and a part of each resin portion (that is, a resin composition forming each resin portion) is filled into the void of the portion constituting a three-dimensional network lattice of the corresponding metal portion. Therefore, a lattice structure of each metal portion and the corresponding resin portion are tightly coupled together, and the first resin portion and the second resin portion can be prevented from being separated from the respective metal portions. Furthermore, since the first metal portion and the second metal portion are bonded together by the second resin portion, adhesion between the metal portions can be improved.

In another mode of the cage, the first resin portion is formed on the inner diameter side of the metal portion, the second resin portion is formed on the outer diameter side of the metal portion, the metal portion includes the portion constituting a three-dimensional network lattice, and the void of the portion is filled with a part of the first resin portion (that is, a resin composition forming the first resin portion). Therefore, the first resin portion constituting the slide portion of the pocket and a lattice structure of the metal portion are tightly coupled together, and the first resin portion can be prevented from being separated from the metal portion.

Since the inner surface of the pocket hole is formed by the first resin portion and the second resin portion, and the boundary between the first resin portion and the second resin portion in the inner surface of the pocket hole is positioned closer to the outer ring than the pitch circle diameter PCD, the first resin portion reliably allows the pocket and the rolling element to slide on each other on the inner surface of the pocket hole.

Each of the first resin portion and the second resin portion contains the PTFE resin as the base resin and the fibrous reinforcing material, the content of the PTFE resin in the second resin portion is smaller than that in the first resin portion, and the content of the fibrous reinforcing material in the second resin portion is larger than that in the first resin portion. Therefore, it is possible to simultaneously satisfactorily satisfy different required characteristics between the slide portion of the pocket and the guide portion.

Since the rolling bearing of the present invention is the rolling bearing including the cage for a rolling bearing of the present invention, the bearing life can be increased. In particular, the rolling bearing is suitable as a bearing to be used for a liquid fuel turbopump of a rocket engine used in a cryogenic environment.

MODES FOR CARRYING OUT THE INVENTION

Figure 1:
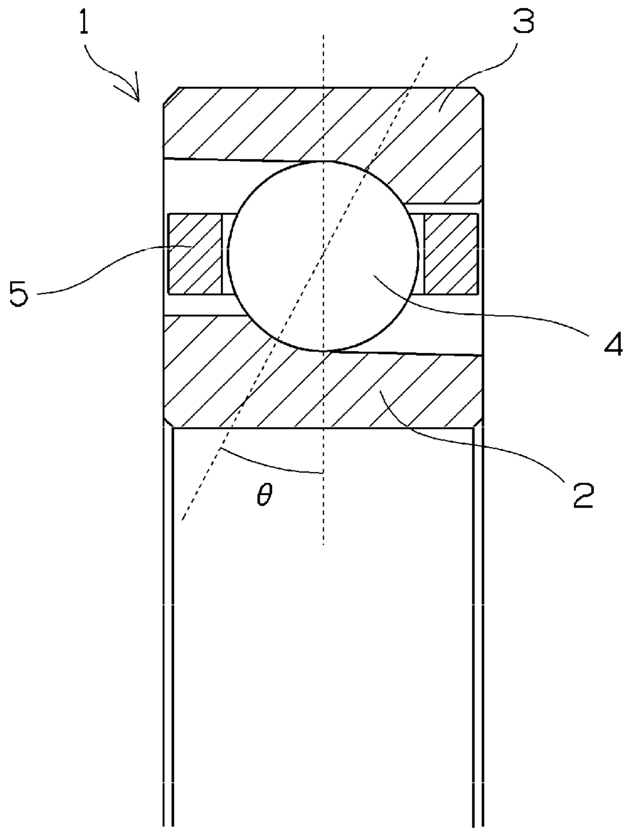
FIG. 1 is an axial cross-sectional view illustrating an example of a rolling bearing of the present invention.

A rolling bearing of the present invention will be described with reference to FIG. 1. FIG. 1 is an axial cross-sectional view of an angular contact ball bearing, which is an example of the rolling bearing of the present invention. Note that details of a cage configuration are omitted. As illustrated in FIG. 1, an angular contact ball bearing 1 includes an inner ring 2, an outer ring 3, a plurality of balls 4 interposed between the inner ring 2 and the outer ring 3, and a cage 5 that holds the balls 4 at regular intervals in a circumferential direction. The angular contact ball bearing 1 is used under a non-lubricating condition without using a flowable lubricant such as lubricating oil or grease. The inner ring 2 and the outer ring 3 are in contact with the balls 4 at a predetermined angle $\theta$ (contact angle) with respect to a radial center line, and a radial load and an axial load in one direction can be applied.

In the angular contact ball bearing 1, both the inner ring 2 and the outer ring 3 are made of a steel material. Any material commonly used as a bearing material can be used for the above steel material. For example, high-carbon chromium bearing steel (SUJ1, SUJ2, SUJ3, SUJ4, SUJ5, etc.; JIS G 4805), carburized steel (SCr420, SCM420, etc.; JIS G 4053), stainless steel (SUS440C, etc.; JIS G 4303), cold-rolled steel, or the like can be used. In addition, the above steel material or a ceramic material can be used for the balls 4.

In FIG. 1, the cage 5 is an outer ring guided cage, and includes a guide portion guided by the outer ring 3 in a part of an outer circumferential surface of the cage. In a configuration of FIG. 1, the cage 5 is guided by the outer ring 3 by the guide portion in contact with an inner circumferential surface of the outer ring 3.

Figure 2:
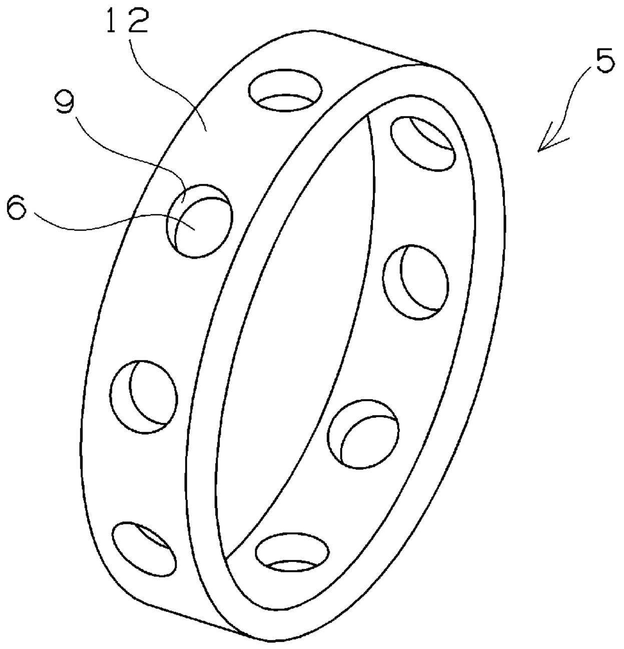
FIG. 2 is a perspective view of an example of a cage for a rolling bearing of the present invention.

FIG. 2 is a perspective view of the cage illustrated in FIG. 1. As illustrated in FIG. 2, the cage 5 is a machined cage, and a plurality of pockets 6 for holding the balls as rolling elements are provided at regular intervals in the circumferential direction. In the present invention, the cage 5 includes an annular cage body having a pocket hole for accommodating each of the rolling elements. A resin portion 9 is formed at least in a portion on which the rolling element slides in an inner surface of each of the pockets 6, and a resin portion 12 having a composition different from that of the resin portion 9 is formed in the guide portion sliding on the outer ring. For example, by forming the resin portion 9 to have a composition with high lubricity and forming the resin portion 12 to have a composition with high wear resistance, it is possible to impart a capability suitable for use of each portion, such as self-lubricity to a slide portion of the pocket 6 and wear resistance to the guide portion of the cage 5. In the present invention, the resin portion 9 corresponds to a first resin portion, and the resin portion 12 corresponds to a second resin portion.

In FIG. 2, the resin portion 9 and the resin portion 12 are each formed, for example, by press-fitting a molten resin composition into the cage body made of metal. These resin portions have different compositions from each other. Here, that the resin portions have different compositions includes a case where the types of starting materials (for example, the types of resins (including a difference in molecular weight or the like), and the types of additives (including a difference in size or the like)) contained in the resin portions are different, and also includes a case where the types of starting materials are the same and the contents of the starting materials are different.

Hereinafter, first, the composition of each resin portion will be described.

As a base resin constituting the resin portion 9, it is preferable to use a resin having excellent lubricating characteristics. For example, it is preferable to use a polyamideimide (PAI) resin, a PTFE resin, a tetrafluoroethylene-perfluoroalkoxyethylene copolymer (PFA) resin, an ultrahigh molecular weight polyethylene (PE) resin, a polyamide (PA) resin, a polyacetal (POM) resin, or the like. Note that these resins may be used alone or as a polymer alloy obtained by mixing two or more kinds of resins. In addition, other resins such as a polyether ether ketone (PEEK) resin or a polyphenylene sulfide (PPS) resin may be mixed as a sub-component.

Among the above resins, the PTFE resin is particularly preferable because it is excellent in property of being transferred to a sliding counter material to reduce a friction coefficient of the slide portion. As the PTFE resin, a typical PTFE resin represented by $—(CF_2—CF_2)n-$ can be used, and a modified PTFE resin obtained by introducing a perfluoroalkyl ether group ($—C_pF_{2p}—O—$) (p is an integer of 1 to 4), a polyfluoroalkyl group ($H(CF_2)_q—$) (q is an integer of 1 to 20), or the like into a typical PTFE resin can also be used. These PTFE and modified PTFE resins may be obtained by adopting either a suspension polymerization method for obtaining a typical molding powder or an emulsion polymerization method for obtaining a fine powder. In addition, as the PTFE resin, a PTFE resin obtained by heating and firing the PTFE resin at a temperature equal to or higher than its melting point can be used. In addition, a powder obtained by further irradiating a heated and fired powder with γ ray, electron ray, or the like can also be used.

Regarding a molecular weight of the PTFE resin, the PTFE resin preferably has a number average molecular weight (Mn) of less than $10^6$.

On the other hand, as a base resin constituting the resin portion 12, a PAI resin, a PTFE resin, a PFA resin, an ultrahigh molecular weight PE resin, a PA resin, a POM resin, a PEEK resin, a PPS resin, or the like can be used. Note that these resins may be used alone or as a polymer alloy obtained by mixing two or more kinds of resins.

A fibrous reinforcing material such as glass fibers, carbon fibers, or aramid fibers can be blended into the resin compositions forming the resin portion 9 and the resin portion 12 as necessary. By blending the fibrous reinforcing material, the wear resistance of the resin portion can be improved. In addition, a linear expansion coefficient of the resin portion can be reduced, and adhesion to the cage body in use can be improved. Among the fibrous reinforcing materials, it is preferable to use relatively inexpensive glass fibers.

In addition, a solid lubricant such as a PTFE resin (excluding a case where the PTFE resin is used as the base resin), graphite, tungsten disulfide, or molybdenum disulfide, an inorganic filler such as magnesium oxide, calcium carbonate, iron oxide, titanium oxide, or silica, or the like can also be blended into the resin compositions forming the resin portion 9 and the resin portion 12. These can be blended alone or in combination.

In each resin portion, the content of the base resin is, for example, 50 mass % or more, preferably 60 mass % to 90 mass %, and more preferably 65 mass % to 90 mass % with respect to the entire resin portion. In addition, from the viewpoint of the wear resistance and the linear expansion coefficient, the fibrous reinforcing material is contained, for example, in an amount of 5 mass % to 40 mass %, and preferably 10 mass % to 30 mass % with respect to the entire resin portion. In addition, in a configuration including the solid lubricant, the content of the solid lubricant is, for example, 5 mass % to 20 mass % with respect to the entire resin portion. In addition, in a configuration including the inorganic filler, the content of the inorganic filler is, for example, 0.3 mass % to 5 mass % with respect to the entire resin portion.

It is preferable that the resin portion 9 has lubricity, and it is preferable that the resin portion 12 has higher wear resistance than that of the resin portion 9 according to required characteristics of each portion of the cage. Here, high wear resistance means a small specific wear rate when each resin portion is slid under the same sliding condition. In the following description, it is assumed that the two resin portions have such a relationship.

For example, in a case where the PTFE resin is used as the base resin of the resin portion 9, the wear resistance of the resin portion 12 can be relatively increased by using the PEEK resin or the PPS resin as the base resin of the resin portion 12. In addition, by adjusting the types, blending amounts, and the like of the fibrous reinforcing material, the solid lubricant, and the resin, it is possible to form resin portions that meet the requirements of the respective slide portions of the pocket and the guide portion.

As a preferable mode of the cage, the resin portion 9 and the resin portion 12 each contain the PTFE resin as the base resin and the fibrous reinforcing material. In this case, the wear resistance and the self-lubricity can be changed by making different the contents of the PTFE resins, the contents of the fibrous reinforcing materials, and the molecular weights of the PTFE resins between the resin portions. Specifically, it is preferable that the content of the PTFE resin in the resin portion 12 is smaller than the content of the PTFE resin in the resin portion 9, and the content of the fibrous reinforcing material in the resin portion 12 is larger than the content of the fibrous reinforcing material in the resin portion 9. Furthermore, it is preferable that the resin portion 9 contains 70 mass % to 90 mass % of the PTFE resin and 10 mass % to 30 mass % of the fibrous reinforcing material with respect to the entire resin portion, and the resin portion 12 contains 65 mass % to 85 mass % of the PTFE resin and 15 mass % to 35 mass of the fibrous reinforcing material with respect to the entire resin portion while satisfying the above magnitude relation.

In addition, by making the molecular weight of the PTFE resin used for the resin portion 12 larger than the molecular weight of the PTFE resin used for the resin portion 9, the wear resistance of the resin portion 12 can be relatively increased.

In the cage of the present invention, each of the above resin portions only needs to be disposed at least at a predetermined position with respect to the cage body. For example, since large hoop stress is applied to the cage in the case of a bearing used in a high-speed rotating environment, the cage body preferably includes a metal portion in order to obtain high specific strength.

Figure 3:
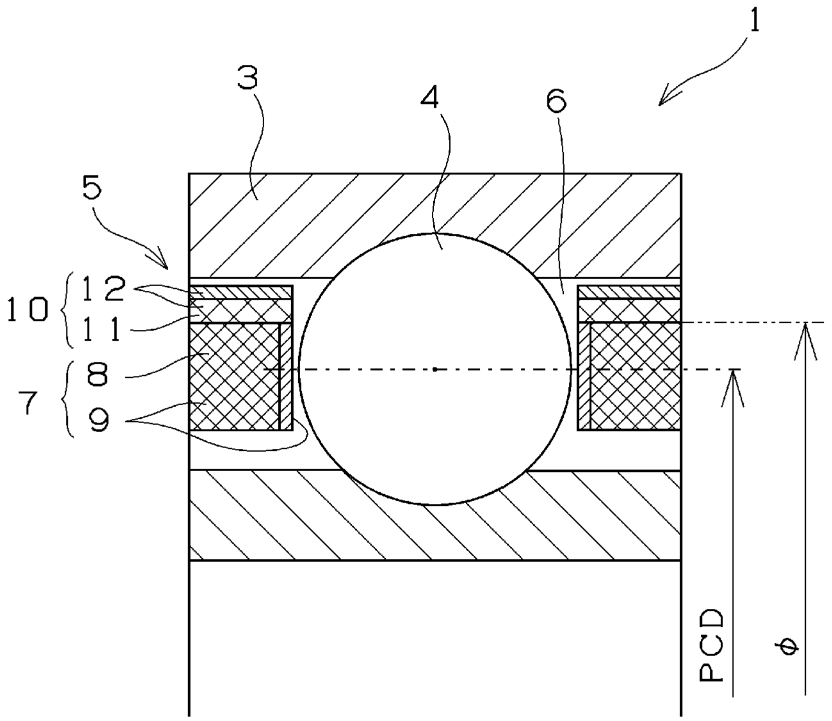
FIG. 3 is a drawing for explaining an example of the cage for a rolling bearing of the present invention.

An example of such a mode will be described with reference to FIG. 3. An axial cross-sectional view illustrated in FIG. 3 schematically illustrates a cross-section of the cage. In FIG. 3, the cage 5 is structurally divided into a cage inner diameter-side portion 7 positioned on the inner diameter side of the cage 5 and a cage outer diameter-side portion 10 positioned on the outer diameter side. Furthermore, the cage inner diameter-side portion 7 includes an annular metal portion 8 and the above-described resin portion 9, and the cage outer diameter-side portion 10 includes an annular metal portion 11 and the above-described resin portion 12. In this mode, the cage body includes the metal portions 8 and 11. In FIG. 3, a portion where the metal portion and the resin portion are mixedly present is indicated by cross hatching for convenience. The same applies to FIGS. 7, 8, and 10 described later.

As illustrated in FIG. 3, the resin portion 9 of the cage inner diameter-side portion 7 is formed in the slide portion of each of the pockets 6 on which the corresponding ball 4 slides, and the resin portion 12 of the cage outer diameter-side portion 10 is formed in the guide portion sliding on the outer ring 3. In a configuration of FIG. 3, a part of the inner surface of the pocket 6 is also formed by the resin portion 12. By making an outer diameter φ of the cage inner diameter-side portion 7 larger than a pitch circle diameter PCD of the bearing, the ball 4 can be slid only on the resin portion 9 having high self-lubricity. In this case, a surface of portions having different resin compositions in the inner surface of the pocket 6, that is, a boundary between the resin portion 9 and the resin portion 12 is positioned closer to the outer ring 3 than the pitch circle diameter PCD.

Figure 4:
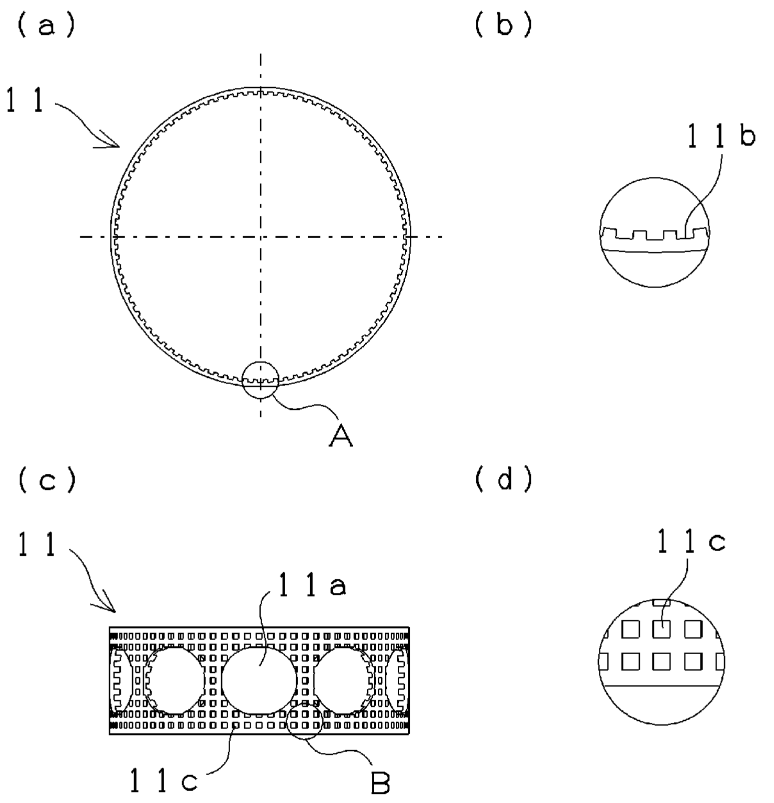
FIG. 4 is a plan view and the like of a metal portion constituting a cage outer diameter-side portion in FIG. 3.

Next, details of each metal portion will be described with reference to FIGS. 4 to 6. FIG. 4(*a*) is a plan view of the metal portion of the cage outer diameter-side portion, FIG. 4(*b*) is an enlarged view of a portion A thereof, FIG. 4(*c*) is a side view of the metal portion, and FIG. 4(*d*) is an enlarged view of a portion B thereof. As illustrated in FIG. 4, the metal portion 11 is an annular member having a pocket hole 11*a* constituting a part of each pocket of the cage. The metal portion 11 includes a portion constituting a three-dimensional network lattice. A void formed by the lattice communicates with the outside and constitutes a communication hole. In general, a three-dimensional network lattice structure in which periodically repeating lattices are three-dimensionally connected is referred to as a lattice structure. Examples thereof include a structure in which simple cubic lattices, body-centered cubic lattices, or face-centered cubic lattices are three-dimensionally connected. In FIG. 4, on the basis of the three-dimensional network lattice, recesses and protrusions 11*b* are repeatedly formed on an inner circumferential surface of the metal portion 11 (see FIG. 4(*b*)), and a plurality of recesses 11*c* are formed on an outer circumferential surface of the metal portion 11 (see FIG. 4(*d*)). Such voids are filled with a part of the resin.

Figure 5:
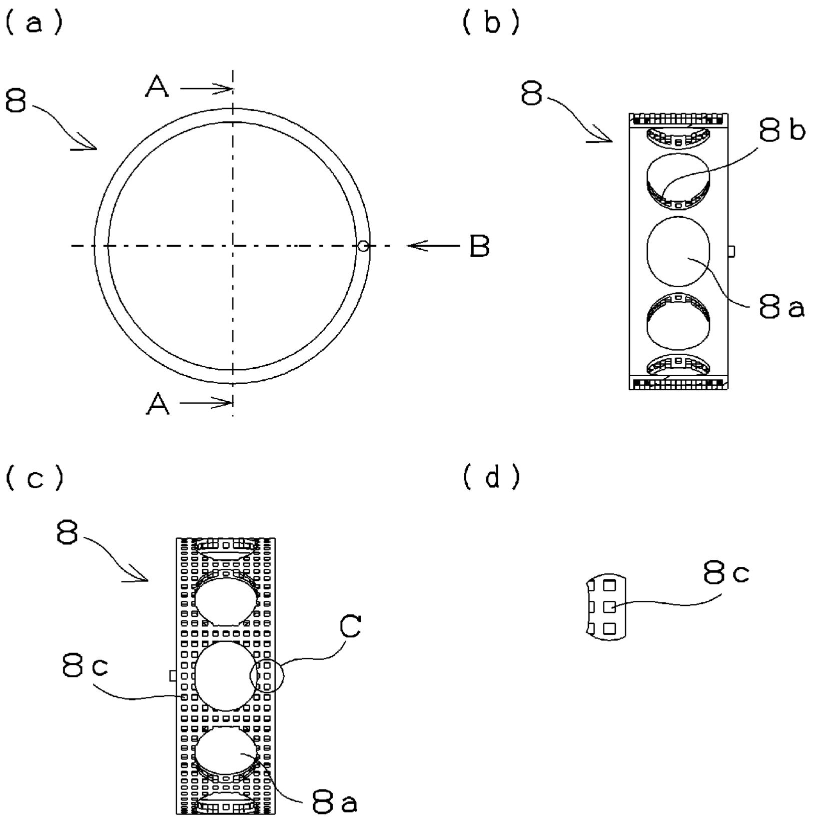
FIG. 5 is a plan view and the like of a metal portion constituting a cage inner diameter-side portion in FIG. 3.

FIG. 5(*a*) is a plan view of the metal portion of the cage inner diameter-side portion, FIG. 5(*b*) is a cross-sectional view thereof taken along line A-A, FIG. 5(*c*) is a view on arrow B, and FIG. 5(*d*) is an enlarged view of a portion C thereof. As illustrated in FIG. 5, the metal portion 8 is an annular member having a pocket hole 8*a* constituting a part of each pocket of the cage. The metal portion 8 also includes a portion constituting a three-dimensional network lattice. In FIG. 5, on the basis of the three-dimensional network lattice, a plurality of recesses 8*b* are formed on an inner surface of the pocket hole 8*a* of the metal portion (see FIG. 5(*b*)), and a plurality of recesses 8*c* are formed on an outer circumferential surface of the metal portion 8 (see FIG. 5(*d*)). Such voids are filled with a part of the resin. Note that an inner circumferential surface of the metal portion 8 illustrated in FIG. 5 is formed of a smooth curved surface. In addition, an axial end surface is formed of a smooth flat surface except for a protrusion for positioning used in forming the pocket hole.

As illustrated in FIGS. 4 to 5, each of the metal portions includes the portion constituting the three-dimensional network lattice, and thus has a complicated structure. These metal portions are manufactured by a 3D printer or precision casting.

Figure 6:
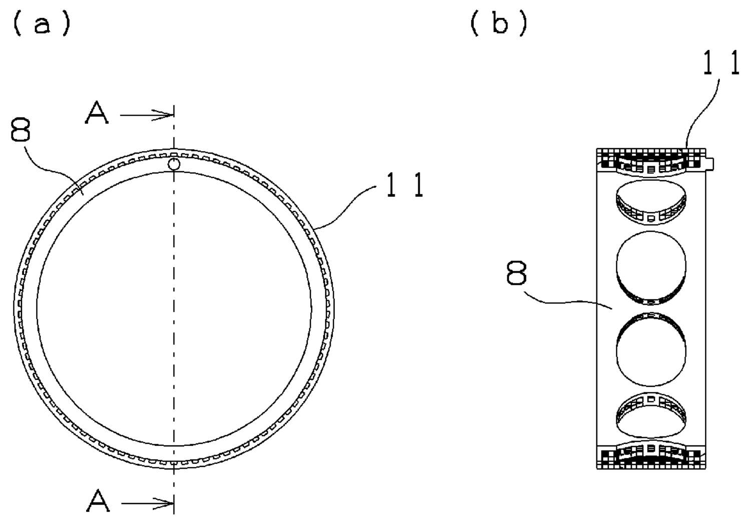
FIG. 6 is a plan view and the like illustrating a state in which the metal portions are fitted to each other.

FIG. 6(*a*) illustrates a state in which these metal portions are assembled together, and FIG. 6(*b*) illustrates a cross-sectional view thereof taken along line A-A. The metal portion 8 is fitted into a space surrounded by the inner circumferential surface of the metal portion 11 to form the annular cage body. In this case, the metal portions are assembled such that circumferential positions of their pocket holes coincide with each other. Note that the inner diameter dimension of the metal portion 11 is formed to be the same as or slightly larger than the outer diameter dimension of the metal portion 8. As illustrated in FIG. 6(*a*), a gap is formed between the metal portion 8 and the metal portion 11 by the recesses and protrusions (and the dimensional difference) formed on the inner circumferential surface of the metal portion 11. The resin composition forming the resin portion flows into the gap, so that the metal portions are press-bonded to each other.

As a metal constituting each metal portion, an aluminum alloy, a titanium alloy, a stainless alloy, Inconel, or the like can be used. The same metal material or different metal materials may be used for the metal portion 8 and the metal portion 11.

Figure 7:
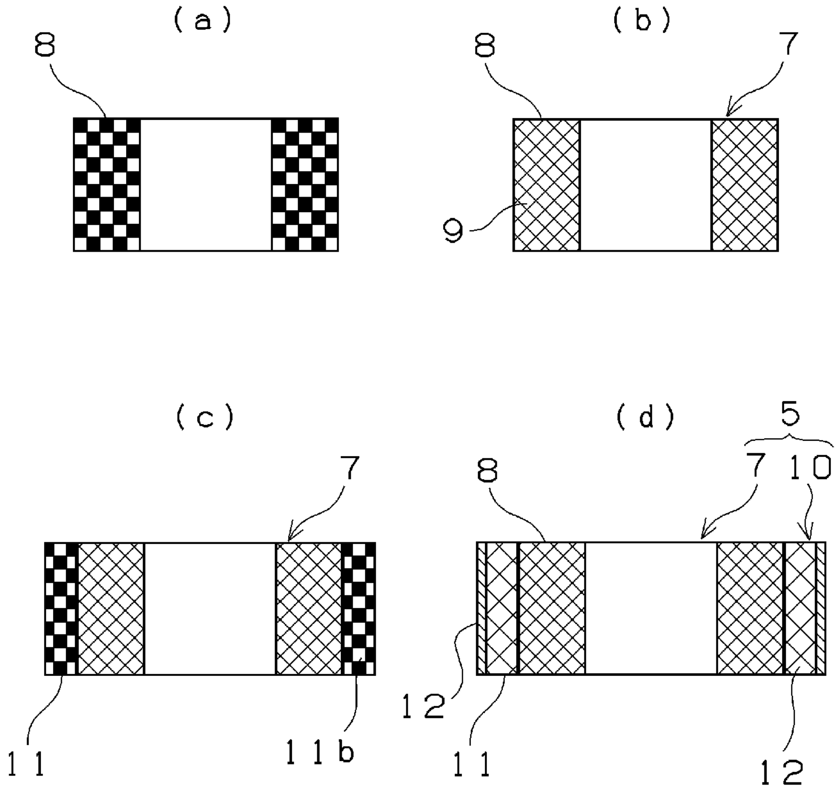
FIG. 7 is a manufacturing process diagram of the cage for a rolling bearing in FIG. 3.

FIG. 7 schematically illustrates a manufacturing process diagram of the cage illustrated in FIG. 3. Each drawing illustrates an axial cross-section of the constituent members of the cage. In FIG. 7, the portion constituting the three-dimensional network lattice of the metal portion is indicated by a check pattern for convenience. The same applies to FIG. 10 described later.

In FIG. 7, first, the metal portion 8 of the cage inner diameter-side portion is prepared (FIG. 7(*a*)). Then, the resin composition of the resin portion 9 is heated and press-fitted into the metal portion 8 (FIG. 7(*b*)). At this time, the resin portion 9 is stacked on the slide portion of the pocket hole of the metal portion 8. In addition, the resin composition enters the voids of the portion constituting the three-dimensional network lattice of the metal portion 8, so that the voids are filled with a part of the resin portion 9. As a result, the metal portion 8 and the resin portion 9 are tightly coupled together by an anchor effect.

Subsequently, the metal portion 11 of the cage outer diameter-side portion is fitted to the obtained cage inner diameter-side portion 7 (FIG. 7(*c*)). Then, the resin composition of the resin portion 12 is heated and press-fitted into the metal portion 11 to obtain the cage 5 (FIG. 7(*d*)). At this time, the resin portion 12 is stacked on the outer circumferential surface of the metal portion 11. In addition, the resin composition enters the voids of the portion constituting the three-dimensional network lattice of the metal portion 11, so that the voids are filled with a part of the resin portion 12. As a result, the metal portion 11 and the resin portion 12 are tightly coupled together by an anchor effect.

Furthermore, in the step of FIG. 7(*d*), the metal portion 8 and the metal portion 11 are bonded together by thermocompression bonding of the resin composition forming the resin portion 12. That is, since the gap between the metal portion 8 and the metal portion 11 and the voids of the metal portion 8 are filled with a part of the molten resin composition, an excellent anchor effect can be exhibited. Furthermore, the resin portion 9 and the resin portion 12 are also coupled together by thermocompression bonding of the resin portion 9 present on the outer diameter surface of the metal portion 8 and the molten resin composition. In addition, the resin portion 12 serving as an adhesive preferably has a lower linear expansion coefficient than the linear expansion coefficient of the resin portion 9 from the viewpoint of adhesion.

As described above, in the cage illustrated in FIGS. 3 to 7, the cage is divided into two components: the inner diameter-side portion and the outer diameter-side portion, and two types of lubricative portions are formed by press-fitting the resins having different compositions into the respective portions. Specifically, by pouring the resin into each component in a stepwise manner, a resin layer used for the cage outer diameter-side portion is formed on the guide portion, and a resin layer used mainly for the cage inner diameter-side portion is formed on the slide portion of each pocket. As a result, a lubricative layer having enhanced wear resistance can be formed on the guide portion, and a lubricative layer having enhanced self-lubricity can be formed on the inner surface of the pocket. In addition, by press-fitting the resin into the metal portion having the lattice structure to form each resin portion, the metal portion and the resin portion are more tightly coupled together as compared with insert molding, and the resin portion has excellent peeling resistance.

Note that each resin portion can be formed other than by pouring the molten resin composition into the voids of the lattice structure of the metal portion. For example, each resin portion can also be formed by pressurizing or vibrating a powdery resin to introduce the resin into the voids, and then firing the resin. Typical methods such as compression molding, extrusion molding, and injection molding can also be adopted.

Another example of the cage of the present invention will be described with reference to FIG. 8. In a cage 25 illustrated in FIG. 8, a resin portion 28 and a resin portion 29 are formed for one annular metal portion 27. The resin portion 28 is formed in a slide portion of a pocket 26 on which a ball 24 slides, and the resin portion 29 is formed in a guide portion sliding on an outer ring 23. In addition, in the cage 25, a boundary between the resin portion 28 and the resin portion 29 in an inner surface of the pocket 26 is also positioned closer to the outer ring 23 than the pitch circle diameter PCD, so that the ball 24 can be slid only on the resin portion 28 having high self-lubricity. FIG. 9 illustrates the metal portion 27 in the cage 25.

FIG. 9(*a*) is a plan view of the metal portion, FIG. 9(*b*) is a cross-sectional view thereof taken along line A-A, FIG. 9(*c*) is a view on arrow B, and FIG. 9(*d*) is an enlarged view of a portion C. As illustrated in FIG. 9, the metal portion 27 is an annular member having a pocket hole 27*a* constituting each pocket of the cage. The metal portion 27 also includes a portion constituting a three-dimensional network lattice similarly to the metal portions described above. In FIG. 9, on the basis of the three-dimensional network lattice, a plurality of recesses 27*b* are formed on an inner surface of the pocket hole 27*a* of the metal portion 27 (see FIG. 9(*b*)), and a plurality of recesses 27*c* are formed on an inner circumferential surface of the metal portion 27 (see FIG. 9(*d*)). Such voids are filled with a part of the resin. Note that an outer circumferential surface of the metal portion 27 illustrated in FIG. 9 is formed of a smooth curved surface. In addition, an axial end surface is formed of a smooth flat surface except for a protrusion for positioning used in forming the pocket hole. As a metal constituting the metal portion 27, an aluminum alloy or the like can be used as described above.

Figure 8:
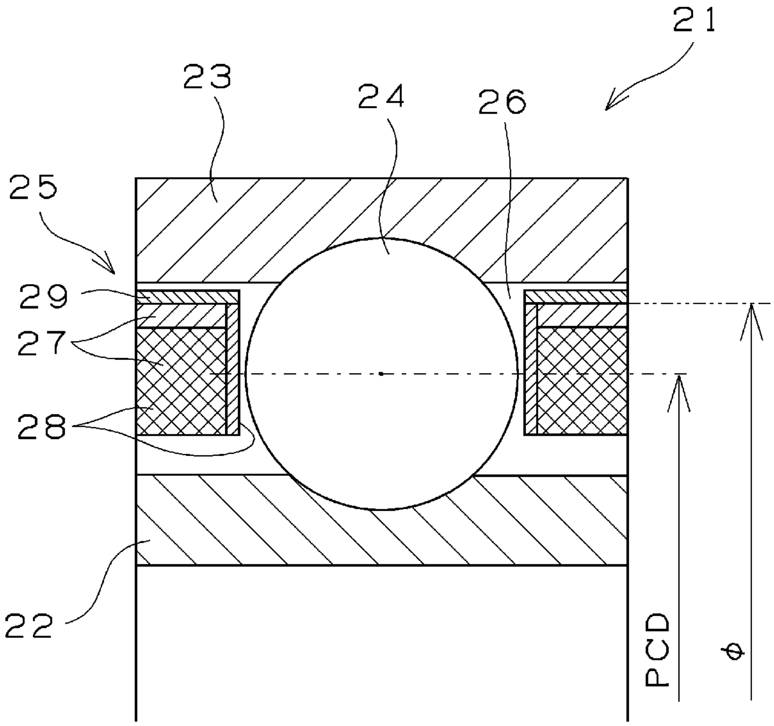
FIG. 8 is a drawing for explaining another example of the cage for a rolling bearing of the present invention.
Figure 9:
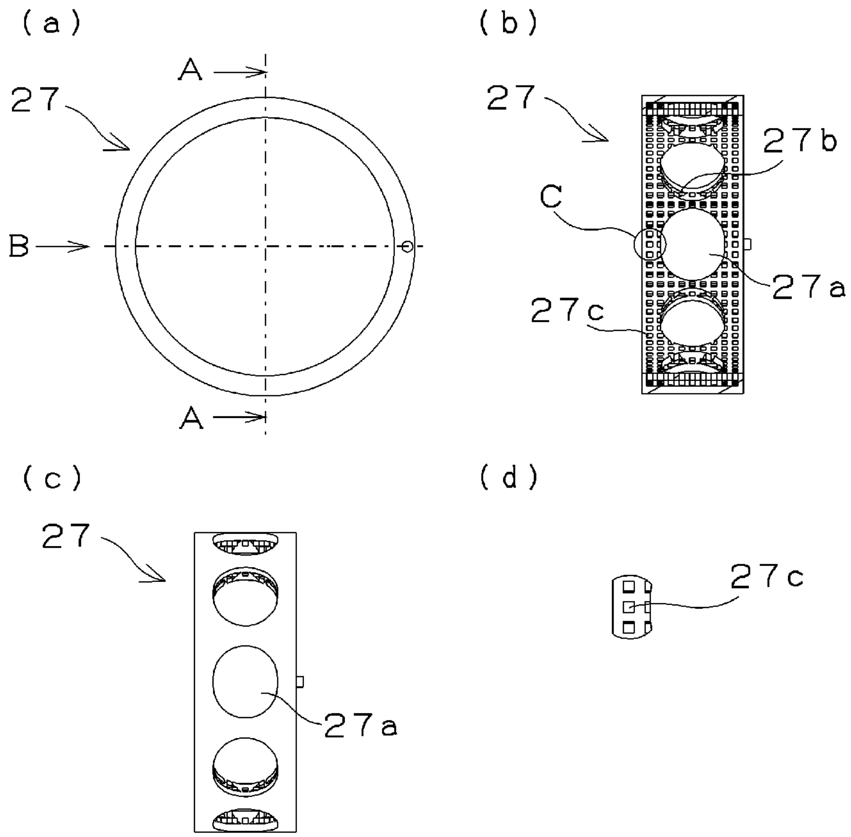
FIG. 9 is a plan view and the like of a metal portion in FIG. 8.
Figure 10:
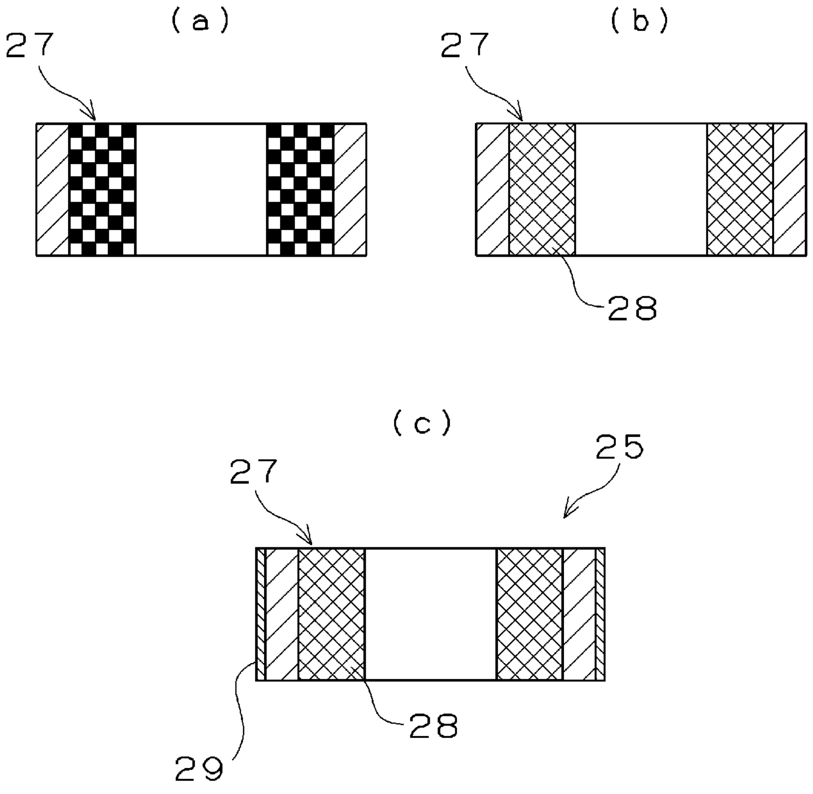
FIG. 10 is a manufacturing process diagram of the cage for a rolling bearing in FIG. 8.

FIG. 10 schematically illustrates a manufacturing process diagram of the cage illustrated in FIG. 8. First, the metal portion 27 is prepared (FIG. 10(*a*)). Note that the hatched line of an outer diameter portion of the metal portion 27 in FIG. 10(*a*) represents the smooth curved surface of the outer circumferential surface. Then, the outer circumferential surface of the metal portion 27 is fixed to a mold, and a resin composition of the resin portion 28 is press-fitted (FIG. 10(*b*)). At this time, the resin portion 28 is stacked on the slide portion of the pocket hole of the metal portion 27. In addition, the resin composition enters the voids of the portion constituting the three-dimensional network lattice of the metal portion 27, so that the voids are filled with a part of the resin portion 28. As a result, the metal portion 27 and the resin portion 28 are tightly coupled together by an anchor effect.

Subsequently, the inner circumferential surface of the metal portion 27 in which the resin portion 28 is formed is fixed to a mold, and a resin composition of the resin portion 29 is press-fitted into the outer circumferential surface of the metal portion 27. As a result, the resin portion 29 is stacked on the guide portion. In addition, after the press-fitting of the resin, an unnecessary resin portion may be scraped off as necessary.

As described above, in the cage illustrated in FIGS. 8 to 10, two types of lubricative portions are formed by forming the resin portions having different compositions between the inner diameter side and the outer diameter side in one annular metal portion. This cage is less expensive than the cage illustrated in FIG. 3 because the number of man-hours of the metal component is reduced, but the resin portion 29 formed in the guide portion has lower adhesion strength than that of the cage illustrated in FIG. 3. In order to increase the adhesion strength of the resin portion 29, the outer circumferential surface of the metal portion 27 may be subjected to a roughening treatment or the like.

The cage of the present invention is not limited to the above modes. For example, in the above description, the metal portion having the lattice structure is used for the cage body. However, an annular metal portion having no lattice structure may be used. In this case, in order to improve the adhesion strength between the metal portion and each resin portion, it is preferable to subject the surface of the metal portion to a roughening treatment. As the roughening treatment, a mechanical roughening method such as shot blasting, an electrical roughening method such as a glow discharge or plasma discharge treatment, a chemical roughening method such as an alkali treatment, or the like can be adopted. In addition, as the cage body, a fiber-reinforced plastic such as CFRP or GFRP having higher strength than each resin portion may be used instead of the metal portion.

Although the outer ring guided cage has been described above, the present invention is not limited thereto, and an inner ring guided cage may be used in which the cage is slid on an outer circumferential surface of the inner ring to be guided. In this case, it is preferable to form the resin portion (second resin portion) having improved wear resistance on an inner circumferential surface of the cage serving as the guide portion. In this case, the boundary between the first resin portion and the second resin portion is positioned closer to the inner ring than the pitch circle diameter PCD.

Since the cage has the above structure, the rolling bearing of the present invention can be used in an environment where no flowable lubricant is used. In particular, the rolling bearing is suitable for use in a cryogenic environment in which liquid hydrogen, liquid oxygen, liquid nitrogen, liquefied natural gas, or the like is used, or in a vacuum environment. Specifically, the rolling bearing can be used for a liquid fuel turbopump of a rocket engine, a space apparatus such as an artificial satellite, or the like. Note that the rolling bearing can also be used, for example, in an environment at normal temperature or higher, without limitation to the cryogenic environment.

In FIG. 1 and the like, the angular contact ball bearing has been described as an example of the rolling bearing of the present invention. However, the bearing type to which the present invention can be applied is not limited thereto, and the present invention can also be applied to other ball bearings, a tapered roller bearing, a self-aligning roller bearing, a needle roller bearing, or the like.

INDUSTRIAL APPLICABILITY

The cage for a rolling bearing of the present invention can satisfy different required characteristics: lubricity and wear resistance between the portions of the cage, has a long product life, and thus can be widely used as a cage.

REFERENCE SIGNS LIST

1 Angular contact ball bearing (rolling bearing)
2 Inner ring
3 Outer ring
4 Ball
5 Cage
6 Pocket
7 Cage inner diameter-side portion
8 Metal portion (first metal portion)
9 Resin portion (first resin portion)
10 Cage outer diameter-side portion
11 Metal portion (second metal portion)
12 Resin portion (second resin portion)
21 Angular contact ball bearing (rolling bearing)
22 Inner ring
23 Outer ring
24 Ball
25 Cage
26 Pocket
27 Metal portion
28 Resin portion (first resin portion)
29 Resin portion (second resin portion)

The invention claimed is:

1. A cage for a rolling bearing that holds a plurality of rolling elements in a rolling bearing and is guided by an inner ring or an outer ring, the cage comprising:

a cage body having an annular shape and including a pocket hole for accommodating each of the rolling elements; a first resin portion formed at least in a portion on which each of the rolling elements slides in an inner surface of the pocket hole of the cage body; and a second resin portion having a composition different from a composition of the first resin portion and formed in a guide portion of the cage body sliding on the inner ring or the outer ring, wherein the cage body includes a metal portion, the cage is an outer ring guided cage guided on an inner circumferential surface of the outer ring, and the metal portion includes a first metal portion having an annular shape and positioned on an inner diameter side, and a second metal portion having an annular shape, positioned on an outer diameter side, and to which the first metal portion is fitted, the first resin portion is formed in the first metal portion, and the second resin portion is formed in the second metal portion.

2. The cage for a rolling bearing according to claim 1, wherein each of the first metal portion and the second metal portion includes a portion constituting a three-dimensional network lattice, a void of the portion constituting the three-dimensional network lattice of the first metal portion is filled with a part of the first resin portion, and a void of the portion constituting the three-dimensional network lattice of the second metal portion is filled with a part of the second resin portion.

3. The cage for a rolling bearing according to claim 1, wherein the first metal portion and the second metal portion are bonded together by the second resin portion.

4. The cage for a rolling bearing according to claim 1, wherein the cage is an outer ring guided cage guided on an inner circumferential surface of the outer ring, and the first resin portion is formed on an inner diameter side of the metal portion, and the second resin portion is formed on an outer diameter side of the metal portion.

5. The cage for a rolling bearing according to claim 4, wherein the metal portion includes a portion constituting a three-dimensional network lattice, and a void of the portion constituting the three-dimensional network lattice is filled with a part of the first resin portion.

6. The cage for a rolling bearing according to claim 1, wherein the inner surface of the pocket hole is formed by the first resin portion and the second resin portion, and a boundary between the first resin portion and the second resin portion in the inner surface of the pocket hole.

7. The cage for a rolling bearing according to claim 1, wherein the polytetrafluoroethylene resin has a number average molecular weight of less than $10^6$.

8. The cage for a rolling bearing according to claim 1, wherein a metal constituting the metal portion is an aluminum alloy, a titanium alloy, a stainless alloy, or Inconel.

9. A rolling bearing comprising an inner ring and an outer ring, a rolling element interposed between the inner ring and the outer ring, and a cage configured to hold the rolling element, wherein the cage is the cage for a rolling bearing according to claim 1.

10. A cage for a rolling bearing that holds a plurality of rolling elements in a rolling bearing and is guided by an inner ring or an outer ring, the cage comprising:

a cage body having an annular shape and including a pocket hole for accommodating each of the rolling elements; a first resin portion formed at least in a portion on which each of the rolling elements slides in an inner surface of the pocket hole of the cage body; and a second resin portion having a composition different from a composition of the first resin portion and formed in a guide portion of the cage body sliding on the inner ring or the outer ring, wherein the cage body includes a metal portion, the cage is an outer ring guided cage guided on an inner circumferential surface of the outer ring, and the metal portion includes a first metal portion having an annular shape and positioned on an inner diameter side, and a second metal portion having an annular shape, positioned on an outer diameter side, and to which the first metal portion is fitted, the first resin portion is formed in the first metal portion, and the second resin portion is formed in the second metal portion wherein each of the first resin portion and the second resin portion contains a polytetrafluoroethylene resin as a base resin and a fibrous reinforcing material, and a content of the polytetrafluoroethylene resin in the second resin portion is smaller than a content of the polytetrafluoroethylene resin in the first resin portion, and a content of the fibrous reinforcing material in the second resin portion is larger than a content of the fibrous reinforcing material in the first resin portion.

* * * * *